Feb. 18, 1941. C. W. ZIES 2,232,583
STEAM TRAP
Filed June 8, 1936 2 Sheets-Sheet 1
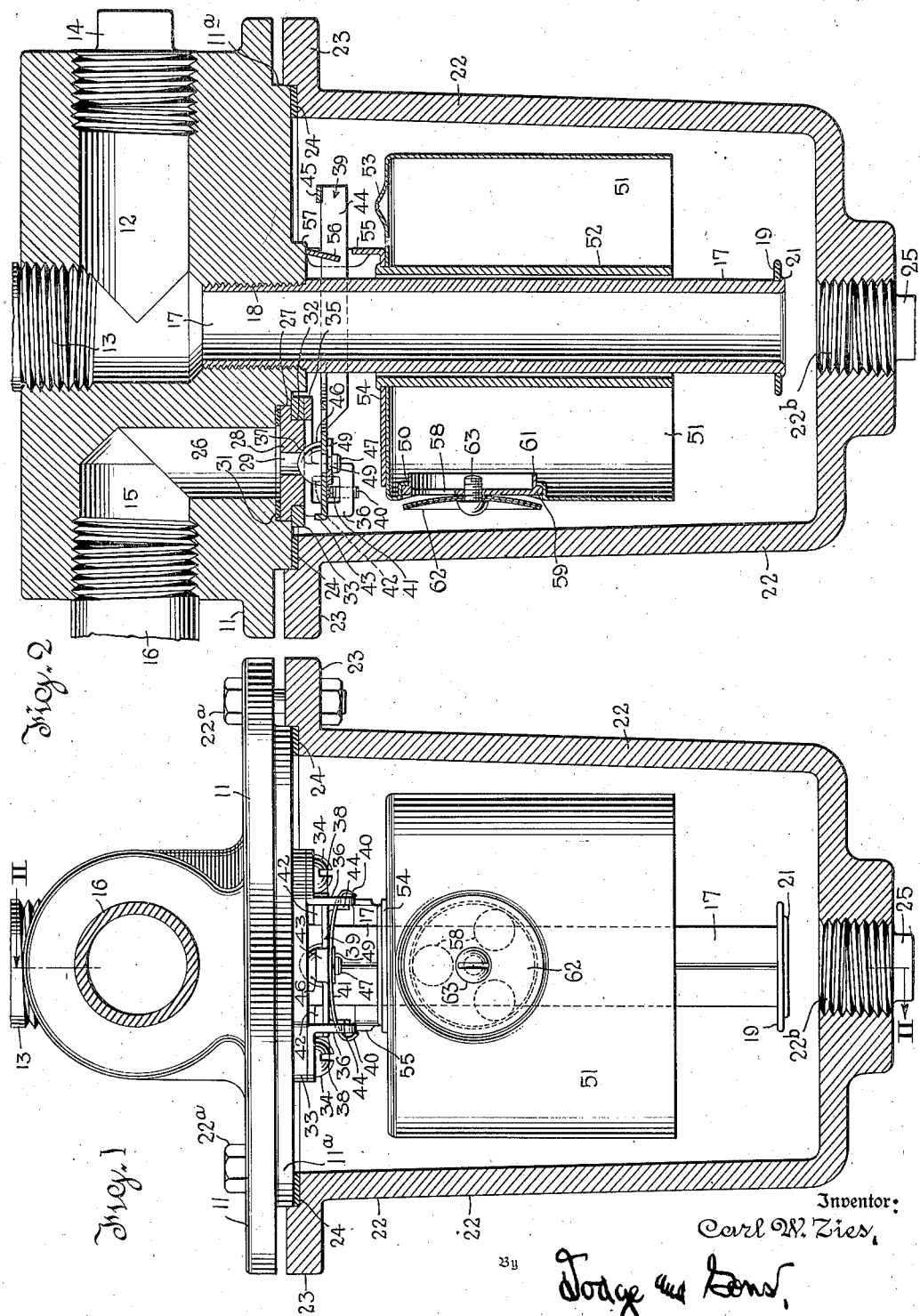
Inventor:
Carl W. Zies,
By Dodge and Sons,
Attorneys Feb. 18, 1941.   C. W. ZIES   2,232,583
STEAM TRAP
Filed June 8, 1936   2 Sheets-Sheet 2
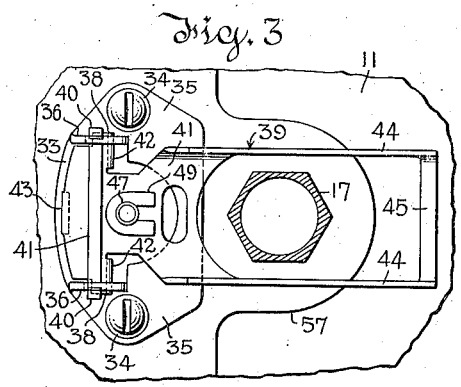
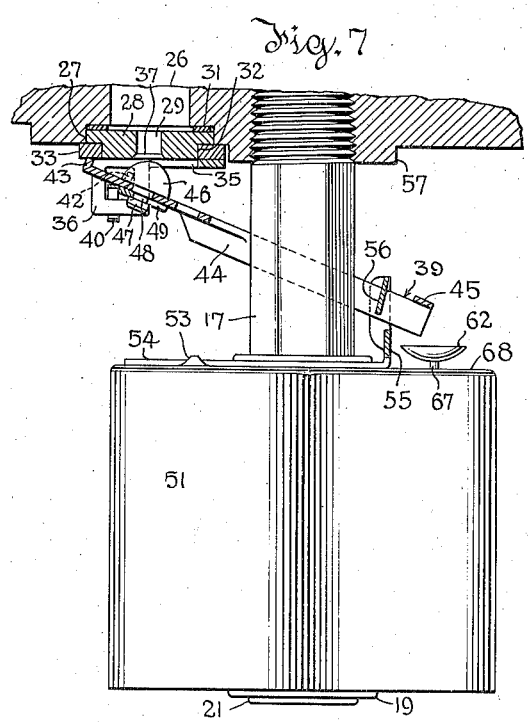
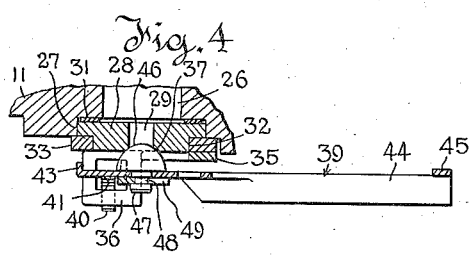
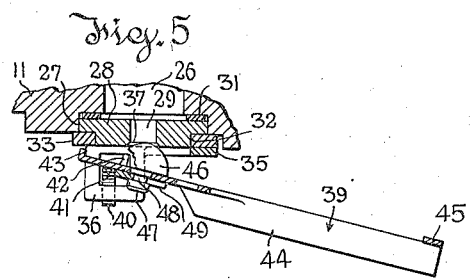
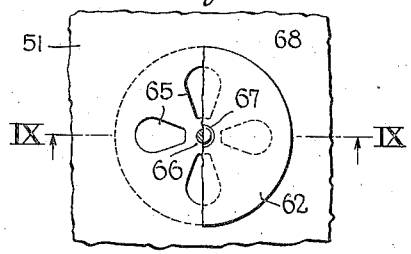
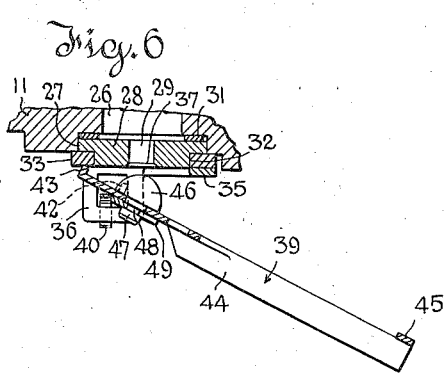
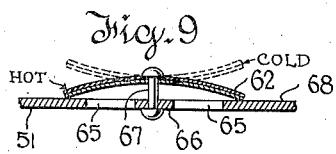
Inventor
Carl W. Zies
By Jolye and Dow
Attorneys

Patented Feb. 18, 1941

2,232,583

UNITED STATES PATENT OFFICE 2,232,583

STEAM TRAP

Carl W. Zies, Lakewood, Ohio, assignor to The
V. D. Anderson Company, Cleveland, Ohio, a
corporation of Ohio Application June 8, 1936, Serial No. 84,235

7 Claims. (Cl. 236—53)

This invention relates to steam traps, and particularly to traps of the inverted bucket type.

The size of steam traps of the prior art has, for the most part, been excessive in proportion to the amount of liquid to be handled. This excess size has been due in part to the arrangement of the mechanism for controlling the outlet valve, in that a large trap body was required to house the leverage and permit the valve to move away from its seat far enough to allow unrestricted flow of liquid through the valve opening.

One of the objects of this invention is, therefore, to provide means for increasing the capacity of a steam trap and at the same time reducing its size.

Another object is to provide a special outlet valve controlling means with a variable leverage whereby the valve, for its initial movement, may be subjected to a large opening force, and then for further opening to a smaller force, thus making it responsive and permitting unrestricted flow of liquid from the trap when the valve is open.

A further object of the invention is to provide means for bringing about a quick response of the outlet valve controlling float, so as to cause substantially instantaneous action of the outlet valve, particularly in response to conditions requiring opening of such valve.

Other objects of the invention will appear from the following description when read in conjunction with the accompanying drawings, in which:

Figure 1 is a vertical sectional view showing the construction of one form of steam trap embodying this invention.

Figure 2 is a vertical section on the line II—II of Figure 1.

Figure 3 is a plan view of the outlet valve operating leverage, as it appears looking upward from the bottom of the trap.

Figures 4, 5 and 6 are views illustrating the positions of the operating leverage in moving the outlet valve from fully closed to fully open position.

Figure 7 is a view in elevation of the outlet valve and its operating mechanism, together with a modified vent controlling structure, certain of the parts being shown in section.

Figure 8 is a detail plan view of the bucket vent controlling mechanism of Fig. 7, partly in section; and Figure 9 is a section on line IX—IX of Figure 8, with the vent controlling mechanism illustrated in open and closed positions.

Referring first to Figure 1, the reference character 11 designates the top casting of a steam trap having an inlet chamber 12 to which an inlet pipe may be connected either vertically, as shown at 13, or horizontally, the horizontal opening being here shown as closed by a plug 14. The casting 11 also contains an outlet chamber 15, to which discharge pipe 16 is connected.

Depending from the inlet chamber 12 is a combined inlet tube and float guide 17, secured to the casting 11 by threading as at 18 and of polygonal cross section below its connection to the casting. The lower end of this tube 17 carries a stop washer 19, secured in place in any conventional manner as by upsetting the lower end of the tube at 21. The tube 17 depends within a bowl 22, this bowl having at its top an annular flange 23 extending radially from the bowl and adapted to be placed in sealing engagement with the lower face of the casting 11. The flange 23 has adjacent its inner margin an annular channel in which a sealing gasket 24 may be mounted. The bowl 22 is secured to the top casting 11 by conventional bolts 22ᵃ, so arranged as to permit removal of the bowl without disconnecting the casting 11 from its inlet or outlet pipes, and without dismantling or altering the float mechanism of the trap. A depending annular portion 11ᵃ of top casting 11 seals against the gasket 24 within the limits of the annular channel in flange 23 when the parts are assembled.

The bottom of the bowl 22 contains a cleaning opening 22ᵇ, closed by a plug 25. This opening is in alignment with the tube 17, and when the plug 25 is removed access may be had to all portions of the inlet passage for cleaning purposes without disassembling the trap or disconnecting it from the line.

The outlet chamber 15 has a vertical branch 26 communicating with the interior of the bowl 22 through an outlet valve. This vertical branch 26 is counterbored at 27 to receive a removable valve disc or plate 28, containing an opening 29 and sealed against the shoulder of counterbore 27 by gasket 31. The valve disc 28 is preferably composed of a hardened non-corrodible alloy which will have maximum life and which may be renewed readily and cheaply. The inner end of opening 29 in this disc terminates in a valve seat 37. Valve disc 28 has an exposed groove 32 at its outer margin. Embracing the disc 28 and fitting into groove 32 is a perforated supporting or clamping plate 33. This plate is preferably composed of non-corrodible metal such as stainless steel, and is secured to casting 11 by cap screws 34. When these screws are tightened, the disc 28 is forced into sealing engagement with the shoulder of counterbore 27 and gasket 31. The internal pressure within the bowl holds this disc in tight sealing position. This insures sealing engagement throughout the area of contact between gasket 31 and disc 28, irrespective of any inequalities in the sealing surfaces. This structure is advantageous over a threaded engagement between the parts, in that with such threaded engagement canting or tipping of the seat may result and in addition to this if there should be any leakage, the wire drawing action of the steam will increase the leakage. When it is desired to remove the valve disc 28, the cap screws 34 are removed and the disc 28 falls away from its seat.

The valve seat construction just described is free of corrodible parts and is characterized by the absence of threaded engagement between the valve disc and the trap body, as in the usual construction. Where the sealing of a valve seat to a casting is dependent upon a threaded connection, corrosion not only destroys the threads and makes removal difficult, but such connections are subject to leakage which is difficult to cure. If the valve seat is renewed, the entire body must be replaced. If the threaded casting has become corroded, it is difficult to get a seal between the new part and the old. All disadvantages of the prior art are completely overcome by the present construction. A perfect seal can be had at all times, corrosion is nonexistent, and the valve seat may be replaced cheaply and quickly by unskilled labor and without special tools.

The screws 34 not only serve to secure the plate 33 in place, but also serve as a support for a bearing plate 35. At its rear edge, this plate 35 carries two projecting perforated ears 36. These ears are adapted to receive and loosely confine arms 38 of a float lever 39 with which they cooperate.

The lever 39 consists of a body portion having two projecting arms 38 which are provided at their forward edges with two spaced upstanding lugs 42 serving as a high ratio fulcrum cooperating with the bearing plate 35. The body portion of the lever 39 carries a low ratio fulcrum 43 which bears against the plate 33 as the outlet valve is unseated. The body has two side portions 44 connected by a bridge 45 to form an elongated slot or opening surrounding the inlet tube 17.

Cooperating with the valve seat 37 is a spherical valve 46 mounted on the portion 41 and having a stem 47 projecting through an opening in that portion. The stem 47 is grooved at 48 to receive a U-shaped clamp 49 as best shown in Fig. 3. The lever 39 is held up and supported by a bar 41, the two ends 40 of which extend through and are clamped about the lower portions of ears 36. This bar insures that either the fulcrum composed of lugs 42, or the fulcrum 43 is always in engagement with its reacting point. Hence, the action of these fulcrums is selective, and the movement of lever 39 in opening and closing the valve 46 is purely rotation and has no rectilinear or sliding component. The bar 41 on which lever 39 rocks, has its action assisted by the steam or air pressure within the trap, this pressure always tending to lift the lever and to cause one or the other of the fulcrums always to engage its reacting point.

It will be seen that the lugs 42, cooperating with the bearing plate 35, constitute a fulcrum which forms a high ratio leverage, for opening valve 46, and that the portion 43 cooperating with plate 33 serves as a fulcrum for the low ratio leverage. The high ratio fulcrum is formed close to the center line of valve 46, whereas the low ratio fulcrum 43 is substantially removed from that center line. The valve 46 cooperates with the valve seat 37 formed in the lower end of passage 29 in member 28. The polygonal guide tube guides the float 51 in its up and down movement and prevents binding and misalignment. This guide tube cooperating with the tube 52 located centrally of the bucket float 51 and secured to the upper portion thereof, makes it possible for the trap to operate when it is placed with the inlet tube either in vertical position, as shown in the drawings, or with this tube inclined to the vertical. The guide tube always holds the float away from the walls of the bowl and thus maintains the parts in proper alignment even when the trap occupies a tilted position. The polygonal cross section of this tube also reduces the area of contact between the tube and the float tube 52, producing in effect a knife edge bearing which reduces the frictional resistance between these parts as the float moves up and down.

The bucket float 51, which cooperates with the lever 39, contains the usual vent 53 for permitting the escape of air and gas from the float, and at the top carries a plate 54 headed down between the top of the float and the tube 52. Plate 54 carries an upstanding lug 55 having a downwardly projecting angularly disposed struck-out portion 56 which is narrower than the space between the side elements 44 of the lever 39. This formation produces slots or openings which receive the side portions 44 of the lever 39 when the parts are assembled, to form a sliding interlocking engagement between the bucket and the lever.

The part 56 and the lever 39 are constructed with just sufficient clearance to permit assembly and relative sliding movement, and to avoid the presence of lost motion. When the bucket 51 is in its uppermost position to hold valve 46 closed, the lug 55 strikes depending portion 57 on the bottom of casting 11 and this portion causes it to stop. Downward movement of the bucket 51 is limited by engagement between tube 52 and stop washer 19 located on the lower end of inlet tube 17.

In addition to the usual vent opening 53, the bucket 51 contains other openings 58, as indicated in Figs. 1 and 2. These openings 58 are formed in disc 59 having an inwardly projecting annular flange 61 extending through a flanged opening 50 in the side of bucket 51. The center of disc 59 is threaded to receive a screw 63, and forms the seat for a bi-metallic thermostatic member 62. This member 62 is adapted to flex inwardly to close openings 58 or to flex outwardly to the position as shown in Fig. 2 of the drawings, to uncover the openings 58. The two discs which form the thermostatic member 62 have different thermal coefficients of expansion and are rigidly secured together. When the member 62 is cold, that is, its temperature is below a predetermined minimum, the thermostat keeps the position shown in Fig. 2, in which it is concave outward. When the temperature of said member rises above that predetermined value, the discs flex inwardly with a snap action, and become convex outward to closely embrace the margin of the member 59 and seal openings 58.

The temperature of the bi-metallic member 62 is influenced by the fluid surrounding it in the trap. This makes the action of the member quickly responsive to changes in condition of the medium which is being handled by the trap. The location of this member on the side of the trap prevents all possibility of the vents being fouled by an accumulation of scum or other foreign matter collecting on the bucket or the thermostatic member.

The operation of the mechanism shown in Figs. 1 to 6 is as follows:

It will first be assumed that the trap is installed in a system in which the trap and pipe lines are free from water and steam, but do contain air. It will also be assumed that the trap is cold, but that the inlet pipe 13 is connected to a steam heating system and the discharge pipe 16 is connected to the system in any conventional manner.

When the steam is turned on and enters the cold piping and trap, it commences at once to condense, and the temperature of the system rises. The cold air is driven from the trap through the outlet valve and may escape through the float by way of vent 53 and ports 58 which are uncovered. The condensed steam or condensate enters the bowl 22 of the trap through inlet pipe 13, chamber 12 and inlet tube 17. Since the trap is empty, the float 51 will be in its extreme lower position, with the lower end of tube 52 abutting the stop 19, and the outlet valve 46 will be fully open, as shown in Fig. 7. The thermostat 62 will occupy the position shown in Fig. 2, in which the vent ports 58 are exposed to permit gas and air to escape freely from the interior of the float. The water flowing into the trap will fill the bowl 22 and overflow through the outlet valve.

The above operation will continue until steam enters the trap. This steam being lighter than water, passes upwardly in the float 51 and displaces the water through the ports 58 and vent 53. The steam will heat the thermostat 62, and when the thermostat temperature exceeds the value for which it is calibrated, it snaps against the member 59 to close the ports 58, and prevents the escape of steam through those ports. Displacement of liquid in the float, however, continues until the float becomes buoyant and closes the outlet valve.

Whenever steam enters the trap while the float is down and the outlet valve is open, it displaces the water in the bucket, causes the thermostat 62 to close the ports 58, and hence the float becomes buoyant and rises. This steam which is a condensible gas, escapes through the small vent 53 and condenses. The outlet valve will, therefore, remain closed until water enters the trap and condenses the steam in the float, thereby causing the float to lose its buoyancy. The entrance of water will, likewise, decrease the temperature of the thermostat below its critical value, causing it to snap to the vent-opening position of Figure 2, and thus permit the float to sink quickly and open the outlet valve.

The above cycle of operations will be repeated upon successive deliveries of water and steam to the trap. The thermostat will respond instantly to changes in temperature through its critical value, and when water at a temperature below the critical value enters the trap, the thermostat will snap to open position and permit the float to drop quickly and open the outlet valve.

The operation of the double fulcrum leverage is as follows:

When the float 51 is buoyant and occupies its uppermost position, shown in Figures 1 and 2, upward movement of the float is limited by lug 55 engaging stop 57. The valve 46 is held firmly against its seat and lugs 42 engage the plate 35, while the body portion of lever 39 is supported by bar 41.

When the bucket 51 loses its buoyancy and falls, the lug 55 pulls on the outer end of lever 39 and exerts a powerful leverage to move the valve 46 from its seat. The lever fulcrums about the fulcrum point provided by lugs 42, these lugs being closely adjacent the center line of the valve. As shown, the leverage ratio which is effective to move the valve off its seat, is approximately 20:1. As soon as the valve leaves its seat to a position similar to that shown in Figure 5, the pressures exerted on the valve from above and below, become approximately balanced and a much smaller force is required to move the valve.

Appreciable movement of the valve 46 away from its seat, brings the low ratio fulcrum 43 into engagement with plate 33, so that a leverage ratio of approximately 5:1 is effective to move the valve until the tube 52 strikes the stop washer 19 with the valve in full open position. When the float rises to close the valve, the fulcrum is shifted from 43 to 42 as the valve moves from the position of Figure 6 to that of Figure 5.

The effect of this arrangement is to make the outlet valve very responsive to changes of condition, and to enormously increase the capacity of the trap over a prior art trap of the same size, but having the usual fixed fulcrum.

The modified construction shown in Figure 7 of the drawings includes the same valve leverage as that shown in Figure 6, but the snap-acting vent control is of modified construction in that the bi-metallic element is mounted on the top of the bucket rather than on the side. The operation of this element is the same as that which has been previously described, but the capacity of vent attainable is less than in the construction previously described, except in the case of traps of very large size in which a large top float surface is available.

Figures 8 and 9 of the drawings are details showing the thermostatically controlled vent of Figure 7, enlarged to bring out the features of construction clearly. In these figures, the top surface of the bucket contains a plurality of vent openings 65 arranged to be opened and closed by the bi-metallic element 62. This element is secured to a central support 66 by a rivet 67. When the element is cold, the thermostatic disc 62 is concave upwardly, as shown in dotted lines in Fig. 9. In this position the ports 65 are open so as to permit the bucket to sink. When conditions change so as to raise the temperature of the disc 62, it flexes to the full line position with a snap action to seal the ports 65 as the disc is brought into close contact with the top surface 68 of the bucket. The operation of the thermostatic vent of Figs. 7, 8 and 9 is identical with that shown in Figs. 1 and 2, but in the structure of Figs. 7, 8 and 9, the supporting insert for mounting the thermostatic element in the float is omitted.

The particular type of thermostatic device shown herein is known, and no claim is made to that device apart from its use in combination with a steam trap as described herein. While it is not new in the art to provide slow-acting thermostatic means for controlling a float opening, it is novel to provide snap-acting means in such a relation as to permit a quick response and a rapid sinking of a float to eliminate the time lag characteristic of devices heretofore known. In installations where it is necessary to drive air or other gas out of a trap, which is subject to low pressure, or where the volume of gas to be eliminated is large, this arrangement is essential to satisfactory operation. It is also a practical necessity in steam installation where quick heating is a vital factor.

It is known that when a valve is closed it is subject to unbalanced pressure and requires more force to separate the valve from its seat than to move the valve away from its seat after initial separation is once effected. Where lever devices with fixed leverage ratio are use, sufficient leverage must be provided to open the valve when it is subjected to unbalanced pressure, and, consequently, the length of lever is so great that a large trap bowl is required to accommodate it if the valve is to be opened fully. Consequently, in the present construction, it is proposed to so arrange the mechanism that high ratio leverage is provided for causing initial movement of the valve away from its seat, and then low ratio leverage is brought into play to enable the float to draw the valve far away from its seat by a comparatively small float movement. In this way, the capacity of the trap is greatly increased, and undesirable throttling of the outlet by failure of the valve to move away from its seat, is eliminated.

This application is a continuation-in-part of my application Serial Number 719,789, filed April 9, 1934.

Although one form of steam trap embodying this invention has been shown and described, various changes and modifications may be made in the details, within the scope of the appended claims, without departing from the spirit and scope of the invention.

What is claimed is:

1. A steam trap comprising a hollow casing having an inlet and an outlet; a valve for controlling said outlet; an inverted bucket float for controlling said valve, said bucket having a discharge port therein; and snap-acting thermostatic means for controlling the opening and closing of said port in accordance with temperature changes within said trap, said thermostatic means being constructed and arranged to maintain said port fully open when the temperature within the trap is below a predetermined value, and to close said port abruptly and completely when the temperature within the trap exceeds a predetermined value.

2. A steam trap comprising a body having an inlet opening and an outlet opening; an outlet valve; an inverted bucket float constructed and arranged to control said valve, said bucket containing a vent opening and a discharge port of large size relative to said vent opening; and snap-acting thermostatic means for controlling the opening and closing of said port in response to temperature changes within said trap, said thermostatic means being constructed and arranged to maintain said port fully open when the temperature within the trap is below a predetermined value, and to close said port abruptly and completely when the temperature within the trap exceeds a predetermined value.

3. A steam trap comprising a hollow casing having an inlet and an outlet; a valve for controlling said outlet; an inverted bucket float having a discharge port therein; operating leverage connecting said float to said valve; and a bimetallic snap-acting thermostatic disc carried by said bucket and having two positions, said disc being adapted in one position to embrace the margin of said port to close the same, and in the other position to bend away from said port to permit substantially unobstructed flow of gas and liquid therethrough whereby the float is caused to sink rapidly in response to temperature conditions requiring the outlet valve to be opened.

4. A steam trap comprising a hollow trap body having an inlet and an outlet; a valve for said outlet; an inverted bucket float for controlling said valve; a fixed vent opening in the top of said float; a second vent opening in the side of said float and of larger capacity than said fixed vent opening; and snap-acting thermostatic means for opening and closing the second vent in response to predetermined temperature changes within the trap.

5. In a steam trap, the combination of a bowl; a cover for said bowl having an inlet opening; an inlet tube secured to said cover in communication with said inlet and extending downwardly into the bowl and terminating short of the lower portion thereof, said tube likewise standing in alignment with an opening formed in the lower portion of the bowl; and a closure for said opening, said closure when removed allowing free access to the interior of the tube and the inlet with which it is connected, whereby the same may be readily cleaned.

6. In a steam trap, the combination of a bowl; a closure therefor having an inlet and an outlet; a tube secured to the closure and in communication with the inlet and extending downwardly into the bowl, said tube being polygonal in cross section; a float having a tube extending downwardly therethrough, said tube being circular in cross section and surrounding the polygonal tube whereby a minimum of contact between said tubes is afforded; a valve for closing the outlet; and interconnections between said valve and the float.

7. In a steam trap, the combination of a bowl; an inverted bucket float located therein, said bucket having a centrally disposed tube circular in cross section secured to and extending from the upper portion of the bucket downwardly therethrough; a guide tube extending through said first named tube, said guide tube being polygonal in cross section, said polygonal tube serving as a conduit or inlet for the trap, there being present in the trap structure an outlet; a valve for closing said outlet; and interconnections between said valve and said float.

CARL W. ZIES.